Sept. 14, 1937. K. P. EDWARDS 2,092,835
HEAT EXCHANGE DEVICE
Filed July 7, 1936 3 Sheets-Sheet 1
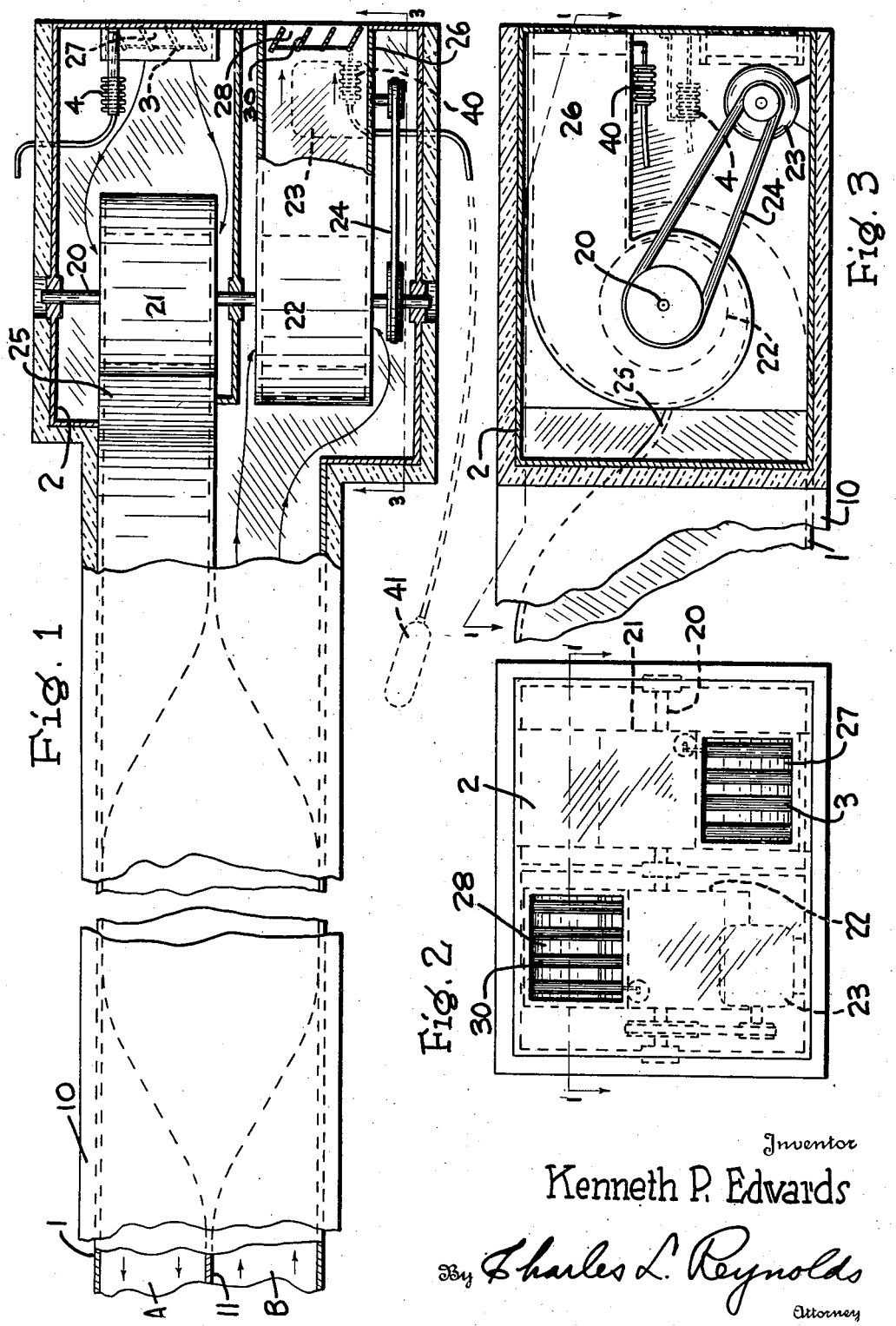
Inventor
Kenneth P. Edwards
By Charles L. Reynolds
Attorney Sept. 14, 1937. K. P. EDWARDS 2,092,835
HEAT EXCHANGE DEVICE
Filed July 7, 1936 3 Sheets-Sheet 2

Inventor
Kenneth P. Edwards
By Charles L. Reynolds
Attorney

Sept. 14, 1937. K. P. EDWARDS 2,092,835
HEAT EXCHANGE DEVICE
Filed July 7, 1936   3 Sheets-Sheet 3

Inventor
Kenneth P. Edwards
By Charles L. Reynolds
Attorney

Patented Sept. 14, 1937

2,092,835

UNITED STATES PATENT OFFICE 2,092,835

HEAT EXCHANGE DEVICE

Kenneth P. Edwards, Tacoma, Wash.

Application July 7, 1936, Serial No. 89,285

9 Claims. (Cl. 257—2)

My invention relates to heat exchangers, and is particularly intended as a means of extracting heat from an outgoing stream of air (assuming the incoming air to be the colder), and taking up such heat in the incoming air. However, should the outgoing air be the colder, the device will function to extract the heat from the incoming air by the outgoing air. The arrangement is useful in the ventilation of homes, factories, auditoriums, theatres, and the like.

In heat exchangers of this general type it is desirable to cause intimate thermal contact between the two currents of air, yet devices previously used for this purpose have, by reason of the arrangement to cause this intimate contact, been such as to seriously impede the movement of the air in each direction. It is therefore an object of the present invention to provide a heat exchanger which will accomplish sufficiently intimate contact between the two currents of air, yet without appreciably altering the volume or impeding the progress of either air stream. In particular it is an object to provide such a heat exchanger in which there is little or no change of direction of either air stream in its passage through the heat exchanger.

It is a further object to simplify the blower means employed in connection with such conduits, and more especially to provide a rotary blower in each conduit connected together to be driven by a single drive means, preferably both mounted on a common shaft, and rotating, hence, in the same direction, but with blower discharge ducts or nozzles leading in opposite directions.

It is a further object to provide means for controlling the relative volume of the incoming and outgoing air, and to do this automatically, so that the volume of incoming air will be regulated, in accordance with the volume of outgoing air, or vice versa, in such manner that the incoming air volume, when brought to the temperature of the outgoing air, will replace the latter with an identical volume of fresh air of the same temperature as the discharged air. It is a further object to accomplish this regulation automatically and thermostatically in accordance with the temperature of the incoming air, since the temperature of the outgoing air may be assumed to be substantially constant.

My invention comprises the novel heat exchanger and associated parts, and the combination thereof, all as shown in the accompanying drawings, described in this specification, and as will be more particularly pointed out and defined in the appended claims.

In the accompanying drawings I have shown my invention in a typical form.

Figure 1 is a plan view of such an installation, parts being broken away on the line 1—1 of Figures 2 and 3.

Figure 2 is an end elevation of the louvers.

Figure 3 is a section taken substantially on the line 3—3 of Figure 1.

Figure 4:
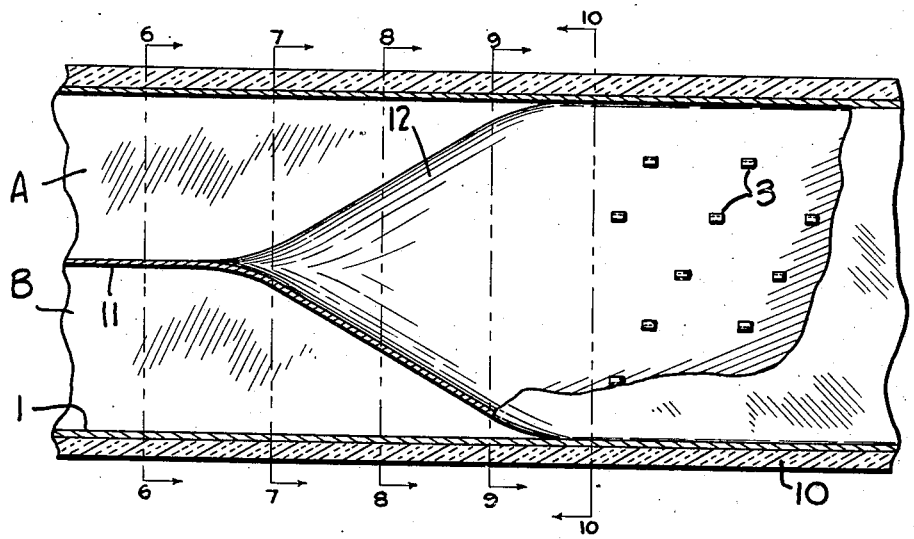
Figure 4 is a horizontal section through one end of the heat exchanger, the opposite end being substantially identical.
Figure 5:
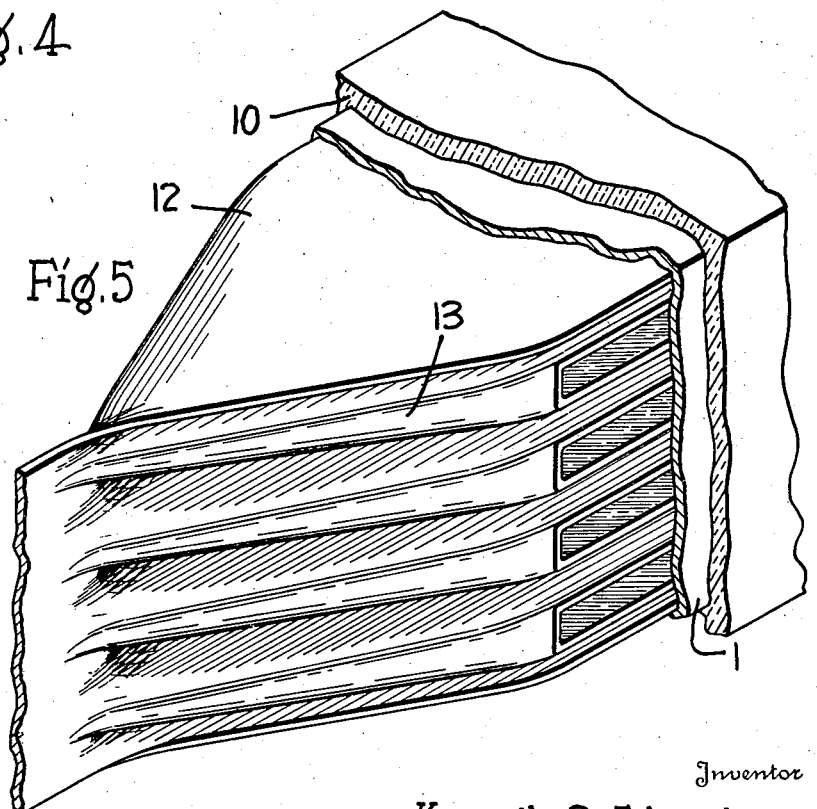
Figure 5 is a perspective view of the same.
Figure 6:
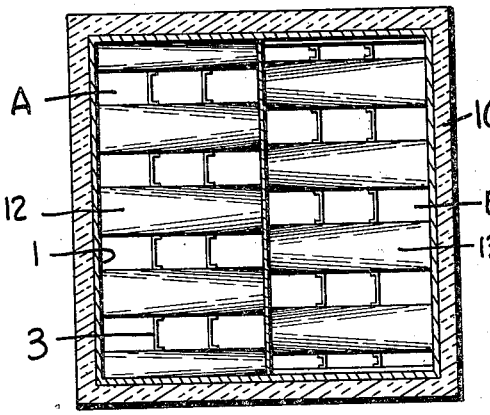
Figure 7:
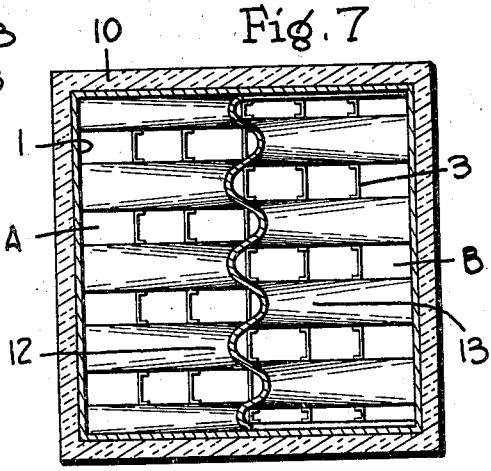
Figure 8:
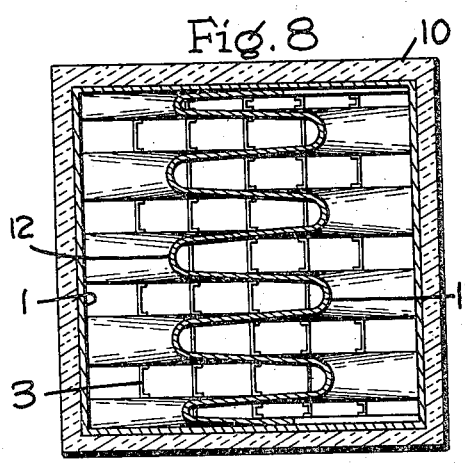
Figure 9:
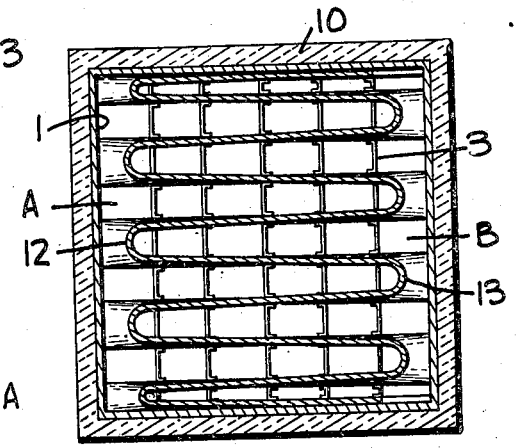
Figure 10:
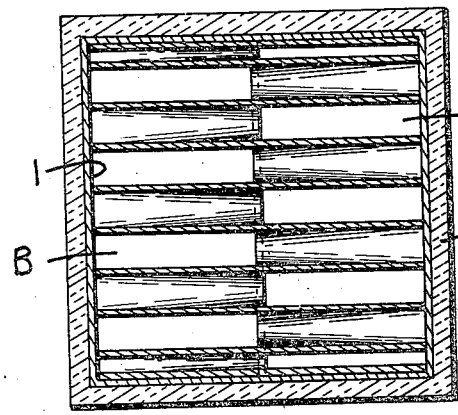

Figures 6, 7, 8, 9 and 10 are transverse sections through the heat exchanger on the respective lines 6—6, 7—7, 8—8, 9—9, and 10—10 of Figure 4.

The system includes a duct or pipe 1 provided with such insulation as may be desired, shown at 10, and provided with a longitudinally extending partition 11, which preferably divides the pipe 1 into two equal conduits A and B, A being the incoming conduit and B the outgoing conduit. At its outer end, communicating with the exterior air or with a space from which fresh air is to be drawn, and into which outgoing air is to be discharged, the pipe terminates in a housing 2 wherein are mounted the blowers 21 and 22. Preferably these are rotary blowers, of a type well known in the ventilating art, but these blowers are carried each upon a common shaft 20, supported in the housing 2, and are both driven from a single motor 23 through suitable drive means such as the pulleys and belt 24.

The discharge duct or nozzle from the blower 21 for the incoming air is indicated at 25, discharging inwardly from the bottom of the blower casing, but the duct or nozzle 26 from the outgoing blower 22 is directed oppositely, and leads to the top of the blower casing. Thus although the two blowers are rotating in the same direction they are discharging air in opposite directions. Incoming air enters at 27, and outgoing air is discharged at 28, and one advantage of locating these openings at different levels is that they are separated, and the incoming and outgoing air does not intermingle to any appreciable extent. In addition, louvers 3 and 30 may be so disposed as to direct the air oppositely, and further to prevent intermingling.

Intermediate the ends of the pipe 1 is the heat exchanger. The partition 11 is fluted transversely, flutes 12 entering the conduit A and equal flutes 13 entering the conduit B. The flutes gradually increase in depth, lengthwise of the pipe 1, as shown by the several cross sectional views, from zero preferably to the full width of the pipe 1. By means of this fluting there is provided a series of layers of air, alternate layers being in communication with the conduit B, for example, and the intermediate layers being in communication with the conduit A, yet each one of these layers is in straight line communication with its conduit, and the aggregate volume of all the layers at any transverse plane in its length is substantially that of the conduit at each end of the heat exchanger. While the depth of each layer is restricted by substantially half, the width of the layer is increased by substantially twice, so that the total aggregate volume in each group of layers, with respect to each other, and each with respect to its conduit at the ends of the heat exchanger, is in effect unchanged, and because there is no change of direction the movement of air through the heat exchanger is substantially unimpeded. This is facilitated, too, by the streamline effect of the gradual increase in depth of the flutings.

Heat transfer devices, indicated as upright bars or spacers 3, may be provided in the heat exchange unit, particularly in the wider part thereof, these serving to transmit heat from the warmer current of air to the colder through the walls of the heat exchanger. These bars are arranged one above the other in columns to act further as spacing supports for the longitudinal partitions. Being arranged in lines inclined with respect to the air flow rather than normal thereto, no appreciable division of or turbulence in the air flow is produced.

It will be noted in the cross sectional views that the upper and lower layers are substantially half the thickness of the inner layers, since these outer layers may be considered as supplying heat to or receiving heat from the adjacent half only of the next inner layer.

All the louvers 3, and likewise all the louvers 30, are connected together, and each set is controlled, independently of the other set, preferably by a suitable thermostatically operable device, indicated at 4 and 40, respectively. Each of these is connected to its thermostat 41, and while these thermostats are separately controlled, they are preferably located to be affected by the temperature of the outside air. By regulating the respective elements 4 and 40, and the connection of each to its louvers, the control is arranged in such manner that the relative volumes of air admitted and air discharged will be such, with relation to the temperature of the outgoing air, usually substantially constant, and with respect to the temperature of the incoming air, usually the only variable, that equal volumes (when compensated for temperature differences) will be displaced within the interior space with which the heat exchanger communicates. This does not mean that a volume of cold air equal to the volume of the outgoing warm air will be admitted, but a volume of cold air sufficient when warmed to the temperature of the warmer outgoing air will be admitted to take the place of that outgoing air. This, of course, usually requires greater closing of the louvers 3 than of the louvers 30, yet this condition may be reversed when the incoming air is warmer than the outgoing air, and it is desired to keep the inside space cool, yet this condition is properly maintained by subjecting the thermostat for both the control devices 4 and 40 to the temperature of the outside air.

It is not to be expected that the incoming air will be heated, or cooled as the case may be, by exchange from the outgoing air, to the initial temperature of the latter, especially since equivalent volumes are being passed through the conduits. The temperature of the incoming air must be brought to the desired temperature by supplemental heating (or cooling) means, but since these form no part of my invention, they have not been illustrated. My system as shown and described conserves heat (or coolness) in the outgoing air and transfers a considerable part thereof to the incoming air, and automatically regulates the volume of air admitted to that which, when brought to the temperature of the outgoing air, will replace an identical volume of the latter, as the latter is discharged.

What I claim as my invention is:

1. A heat exchanger for the purpose described, comprising a straight-line incoming conduit and a straight line outgoing conduit disposed in side by side relation, interrelated flutings between the ends of and extending into both conduits to divide each such conduit into a plurality of layers of a volume capacity aggregating that of the conduit, and each disposed in straight-line relationship to its conduit.

2. A heat exchanger for the purpose described, comprising a pipe having a longitudinally extending partition defining an incoming conduit at one side only and an outgoing conduit at the other side only, said partition, between its ends, being fluted transversely to divide the pipe in planes parallel to the axis of the pipe and angularly disposed relative to the general plane of the partition, into a plurality of layers, of which alternate layers constitute straight-line continuations of the incoming conduit and the intermediate layers constitute straight-line continuations of the outgoing conduit.

3. A heat exchanger for the purpose described, comprising a pipe having a longitudinally extending generally plane partition defining substantially equal incoming and outgoing conduits, said partition, between its ends, being fluted transversely, the fluting gradually increasing in depth from each end towards its midpoint from zero to the full width of the pipe, and dividing the pipe into a plurality of layers disposed parallel to the axis of the pipe and substantially normal to the general plane of the partition, alternate layers constituting straight-line continuations of the incoming conduit and the intermediate layers constituting straight-line continuations of the outgoing conduit.

4. In combination with a heat exchanger for the purpose described, an incoming conduit and an outgoing conduit connected thereto, means to advance air in the appropriate direction through each such conduit, louvers controlling admission to the incoming conduit and louvers controlling discharge from the outgoing conduit, and thermostatically operated means to control each of said louvers in accordance with the temperature of the incoming air.

5. A heat exchanger for the purpose described, comprising a straight unit of substantially constant cross-sectional area, a longitudinally extending divider in each end thereof dividing said unit into two substantially equal conduits, one for incoming air and the other for outgoing air, a plurality of parallel, longitudinal partitions disposed in planes normal to said dividers to form layers of continuous parallel ducts, and means interconnecting said dividers and partitions to guide the incoming air from its conduit at one end of the unit into alternate ducts and back into the same conduit at the other end of the unit, and to guide the outgoing air from its conduit at one end of the unit into ducts intermediate such alternate ducts and into the same conduit at the other end of the unit, without appreciable resistance to the flow, without substantial departure of the air flow from a straight course, and without substantial change in the total transverse area of flow.

6. A heat exchanger comprising an incoming and an outgoing conduit disposed in side by side relation, interrelated flutings between the ends of and extending into both conduits to divide each such conduit, between its ends, into a plurality of layers, the volume capacity of those layers which communicate with each conduit being substantially equal to the volume capacity of such conduit, the two ends of the incoming conduit, at opposite ends of said flutings, being in alignment with each other and with all communicating layers, and the two ends and layers of the outgoing conduit being similarly aligned.

7. A heat exchanger comprising a pipe of uniform cross-section throughout, having a longitudinally extending generally plane partition defining incoming and outgoing conduits each disposed at one side only of the partition, said partition, between its ends, being fluted transversely, to divide the pipe into a plurality of layers disposed parallel to the axis of the pipe and disposed at an angle to the general plane of the partition, alternate layers constituting straight-line continuations of the incoming conduit of volume capacity aggregrating that of the incoming conduit, and the intermediate layers constituting straight-line continuations of the outgoing conduit, and of volume capacity aggregating that of the outgoing conduit.

8. A heat exchanger comprising a pipe of uniform cross-section throughout, having a longitudinally extending generally plane partition defining incoming and outgoing conduits each disposed at one side only of the partition, said partition, between its ends, being fluted transversely, to divide the pipe into a plurality of layers disposed parallel to the axis of the pipe and disposed at an angle to the general plane of the partition, the flutings gradually increasing in depth from each end towards the mid-point from zero to their maximum depth, alternate layers constituting straight-line continuations of the incoming conduit of volume capacity aggregating that of the incoming conduit, and the intermediate layers constituting straight-line continuations of the outgoing conduit, and of volume capacity aggregating that of the outgoing conduit.

9. In combination, in a heat exchanger for the purpose described, an incoming conduit and an outgoing conduit in heat exchange relation thereto, means to regulate relatively the volume of air admitted through the incoming conduit and the air discharged through the outgoing conduit, to restrict the volume of incoming air to such volume as will, when brought to the temperature of the outgoing air, replace substantially the identical volume of outgoing air which is discharged, and means thermostatically controlling said regulating means in accordance with the initial temperature of the incoming air.

KENNETH P. EDWARDS.